United States Patent
Torok et al.

(10) Patent No.: US 12,487,776 B1
(45) Date of Patent: Dec. 2, 2025

(54) METHOD AND APPARATUS FOR TRANSFERRING DATA BETWEEN A HOST COMPUTER AND A SOLID STATE MEMORY

(71) Applicant: Marvell Israel (M.I.S.L) Ltd., Yokneam (IL)

(72) Inventors: Ruven Torok, Cholon (IL); Efraim Rein, Rahanana (IL)

(73) Assignee: Marvell Israel (M.I.S.L) Ltd., Yokneam (IL)

(*) Notice: Subject to any disclaimer, the term of this patent is extended or adjusted under 35 U.S.C. 154(b) by 201 days.

(21) Appl. No.: 17/976,633

(22) Filed: Oct. 28, 2022

Related U.S. Application Data

(60) Provisional application No. 63/273,131, filed on Oct. 28, 2021.

(51) Int. Cl.
*G06F 3/06* (2006.01)

(52) U.S. Cl.
CPC .......... *G06F 3/0659* (2013.01); *G06F 3/0607* (2013.01); *G06F 3/064* (2013.01); *G06F 3/0679* (2013.01)

(58) Field of Classification Search
CPC ...... G06F 3/0659; G06F 3/0607; G06F 3/064; G06F 3/0679
See application file for complete search history.

(56) References Cited

U.S. PATENT DOCUMENTS

| | | | |
|---|---|---|---|
| 5,991,797 A * | 11/1999 | Futral | G06F 9/54 709/216 |
| 10,769,098 B2 | 9/2020 | Joshua | |
| 11,252,109 B1 | 2/2022 | Malin | |
| 11,263,149 B2 | 3/2022 | Zeng | |
| 11,429,595 B2 | 8/2022 | Vishwakarma | |
| 11,481,118 B2 | 10/2022 | Klein | |
| 11,656,775 B2 | 5/2023 | Furey | |
| 2005/0038941 A1* | 2/2005 | Chadalapaka | G06F 13/4009 710/52 |
| 2021/0232694 A1* | 7/2021 | Jannyavula Venkata | H04L 9/0897 |

* cited by examiner

*Primary Examiner* — Gary W. Cygiel

(57) ABSTRACT

A bridge receives a first memory access command from a host computer, the first memory access command including an indication of one or more blocks of memory locations in a host memory of the host computer. The bridge device stores the first memory access command in a queue of the bridge device and determines one or more virtual addresses to be used by the solid state memory for the first memory access command. The bridge generates a second memory access command that is a revised copy of the first memory access command so that the indication of the one or more blocks of memory locations in the host memory is replaced with an indication of the one or more virtual addresses. The bridge sends the second memory access command to the solid state memory while keeping the first memory access command in the queue.

20 Claims, 8 Drawing Sheets

METHOD AND APPARATUS FOR TRANSFERRING DATA BETWEEN A HOST COMPUTER AND A SOLID STATE MEMORY

CROSS REFERENCES TO RELATED APPLICATIONS

This application claims the benefit of U.S. Provisional Patent App. No. 63/273,131, entitled "NVMe-oF to NVMe Access Alignment," filed on Oct. 28, 2021, the disclosure of which is expressly incorporated herein by reference in its entirety.

FIELD OF TECHNOLOGY

This disclosure relates generally to storage networking, and more particularly to bridges that interface solid state devices to network fabrics.

BACKGROUND

Non-Volatile Memory Express, also known as NVMe or NVM Express, is a protocol for accessing storage media such as solid-state drives (SSDs). In NVMe, a host sends memory access commands to an NVMe controller that corresponds to an SSD. The NVMe controller performs the memory access commands using the SSD and transfers data between the host and the SSD. NVMe supports both Physical Region Page (PRP) and Scatter Gather List (SGL) mechanisms for transferring commands and data between the host and the NVMe controller.

NVMe over Fabrics (NVMe-oF) is a protocol that enables NVMe-based commands and data to be transferred between a host and an NVMe controller via a fabric, such as a Fibre Channel (FC) network, an Ethernet network, etc. In NVMe-oF, NVMe commands are included in "capsules" and encapsulated in network transport packets or frames. NVMe-oF supports SGL but does not support PRP.

SUMMARY

In an embodiment, a method for transferring data between a solid state memory and a host computer includes: receiving, at a bridge device, a first memory access command from the host computer, the first memory access command indicating a memory operation to be performed by the solid state memory device and including an indication of one or more blocks of memory locations in a host memory of the host computer; storing the first memory access command in a queue of the bridge device; allocating, by the bridge device, one or more buffers in a buffer memory for the first memory access command; determining, by the bridge device, one or more virtual addresses to be used by the solid state memory device for the first memory access command; generating, by the bridge device, a second memory access command that is a revised copy of the first memory access command, including generating the second memory access command so that the indication of the one or more blocks of memory locations in the host memory is replaced with an indication of the one or more virtual addresses; sending, by the bridge device, the second memory access command to the solid state memory device while keeping the first memory access command in the queue, the sending of the second memory access command to the solid state memory device to prompt the solid state memory device to perform the second memory access command to transfer data between the solid state memory device and the one or more buffers in the buffer memory; and transferring, by the bridge device, data between the one or more blocks of memory locations in the host memory and the one or more buffers within the buffer memory.

In another embodiment, a bridge device for transferring data between a solid state memory and a host computer comprises: a network interface configured to receive memory access commands from the host computer via a network fabric; a solid state memory interface configured to communicatively couple the bridge device to the solid state memory; a buffer memory configured to store data between transferred between the host computer and the solid state memory; a plurality of queues; a controller; and command modification circuitry. The controller is configured to: store a first memory access command in a first queue among the plurality of queues, the first memory access command received from the host computer via the network interface, the first memory access command indicating a memory operation to be performed by the solid state memory device and including an indication of one or more blocks of memory locations in a host memory of the host computer; allocate one or more buffers in a buffer memory for the first memory access command; and transfer data between the one or more blocks of memory locations in the host memory and the one or more buffers within the buffer memory in connection with the first memory access command. The command modification circuitry is configured to: generate a second memory access command that is a revised copy of the first memory access command, including generating the second memory access command so that the indication of the one or more blocks of memory locations in the host memory is replaced with an indication of one or more virtual addresses to be used by the solid state memory device in connection with the first memory access command; and send the second memory access command to the solid state memory device while the first memory access command remains in the queue, the sending of the second memory access command to the solid state memory device to prompt the solid state memory device to perform the second memory access command to transfer data between the solid state memory device and the one or more buffers in the buffer memory.

DETAILED DESCRIPTION

In embodiments described below, a bridge device communicatively couples a host computer with a solid state memory. The bridge device is configured to convert first memory access commands from the host computer that indicate one or more blocks of memory in the host computer using a first mechanism (e.g., a Scatter Gather List (SGL) mechanism) to second memory access commands that indicate the one or more blocks of memory in the host computer using a second mechanism (e.g., a Physical Region Page (PRP) mechanism) and that are then sent to the solid state memory, according to an embodiment. In some embodiments that involve the bridge device receiving a Read command that includes SGL information, techniques described below permit the bridge device to begin transferring data to the host computer that was read from the solid state memory in connection with the Read command prior to the bridge device having received all of the data corresponding to the Read command from the solid state memory, thus reducing latency as compared to other types of bridge devices. In some embodiments that involve the bridge device receiving a Read command that includes SGL information, techniques described below permit the bridge device to utilize buffers having an aggregate size that is less than an aggregate size of the SGL blocks indicated by the Read command, thus reducing a required amount of buffer memory as compared to other types of bridge devices. As a result, an amount of memory of the bridge device for buffering data that was read from the solid state memory prior to the bridge device sending the data to the host computer is significantly reduced as compared to other types of bridge devices, at least in some embodiments.

Figure 1:
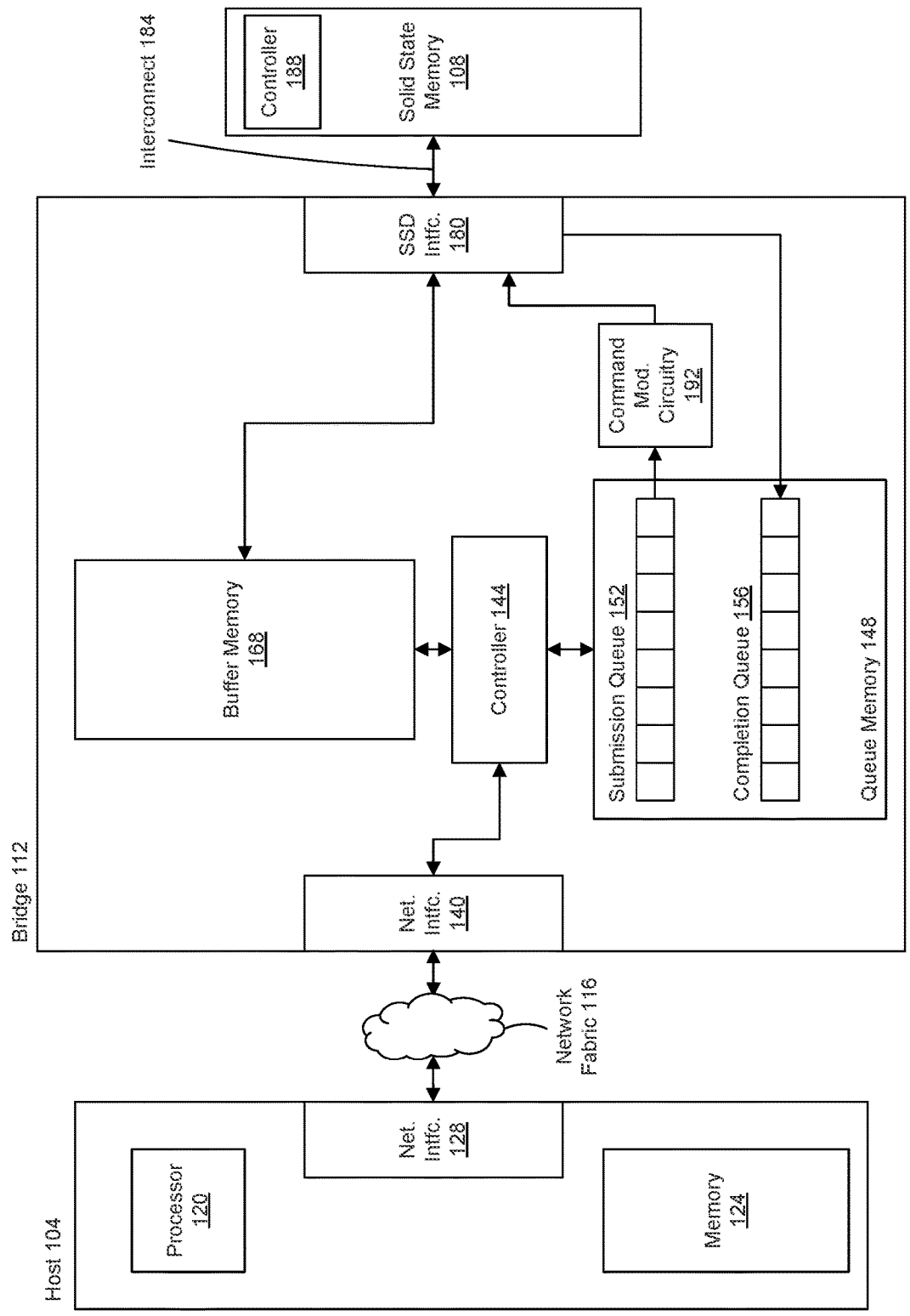
FIG. 1 is a simplified diagram of an example storage network that includes a host computer, a solid state memory, and a bridge that communicatively couples the host computer and the solid state memory, according to an embodiment.

FIG. 1 is a simplified diagram of an example storage network. 100 that includes a host computer 104, a solid state memory 108 (e.g., a solid state drive (SSD)), and a bridge 112 that communicatively couples the host computer 104 and the solid state memory 108, according to an embodiment. The host computer 104 is coupled to the bridge 112 via a network fabric 116, such as a Fibre Channel (FC) network, an Ethernet network, an Infiniband network, etc.

The host computer 104 includes a processor 120, a memory 124, and a network interface 128. The processor 104 is configured to implement a protocol for accessing storage media, such as solid-state drives (SSDs), over a fabric. In an embodiment, the protocol is a Non-Volatile Memory Express (NVMe) over Fabrics (NVMe-oF) protocol. In another embodiment, the protocol is another suitable protocol for accessing storage media over a fabric.

Although the memory 124 is illustrated in FIG. 1 as a single block, the memory 124 comprises multiple memory devices in some embodiments. The memory 124 comprises one or more suitable storage media such as one of, or any suitable combination of two or more of, a random-access memory (RAM), a read-only memory (ROM), etc.

The network interface 128 is configured to perform networking protocol functions corresponding to communications via the network fabric 116. In various embodiments, the network interface 128 comprises an FC network interface, an Ethernet network interface, an Infiniband network interface, etc. In some embodiments, the network interface 128 is configured to perform networking protocol functions corresponding to one of, or any suitable combination of two or more of, transport control protocol/Internet Protocol (TCP/IP), remote direct memory access (RDMA) over Converged Ethernet (RoCE) version 1 (v1), RoCE version 2 (v2), iWARP, Infiniband, etc.

At least in embodiments that utilize NVMe-oF, the processor 120 is configured to create one or more submission queues and one or more corresponding completion queues (not shown in FIG. 1) in the memory 124. The processor 120 enqueues in the submission queues memory access commands that are to be performed by the solid state memory 108. In an embodiment, each completion queue corresponds to one or more submission queues, and completion messages received from the bridge 112 are enqueued in the completion queues. Generally, each completion message corresponds to a memory access command stored in one of the submission queues, and the processor 120 analyzes completion messages in the one or more completion queues to determine when performance of memory access commands in the one or more submission queues have been completed.

In some embodiments, the processor 120 is configured to perform functions corresponding to a memory access protocol, such as the RDMA protocol or another suitable protocol, to facilitate exchanging memory access commands and data between the host computer 104 and the solid state memory 108. In some embodiments, the processor 120 is configured to perform networking protocol functions corresponding to one of, or any suitable combination of two or more of, TCP/IP, RoCE v1, RoCE v2, iWARP, Infiniband, etc.

The bridge 112 comprises a network interface 140 that is configured to perform networking protocol functions corresponding to communications via the network fabric 116. In various embodiments, the network interface 140 comprises an FC network interface, an Ethernet network interface, an Infiniband network interface, etc. In some embodiments, the network interface 140 is configured to perform networking protocol functions corresponding to one of, or any suitable combination of two or more of, TCP/IP, RoCE v1, RoCE v2, iWARP, Infiniband, etc.

The bridge 112 also comprises a controller 144. In some embodiments, the controller 144 is configured to perform functions corresponding to a memory access protocol, such as RDMA or another suitable protocol, to facilitate exchanging memory access commands and data between the host computer 104 and the solid state memory 108. In some embodiments, the controller 144 is configured to perform networking protocol functions corresponding to one of, or any suitable combination of two or more of, TCP/IP, RoCE v1, RoCE v2, iWARP, Infiniband, etc.

In some embodiment, the controller 144 is configured to operate according to the NVMe protocol. In other embodiments, the controller 144 is configured to operate according to another suitable protocol for accessing storage media such as SSDs.

At least in embodiments that utilize NVMe-oF, the controller 144 is configured to create one or more submission queues and one or more corresponding completion queues in a queue memory 148. Although only one submission queue 152 and one completion queue 156 are shown in FIG. 1, the queue memory 148 typically includes multiple submission queues 152 and one or more completion queues 156. When the controller 144 receives a memory access command from the host 104 via the network fabric 116, the controller 144 enqueues the memory access command in the submission queue 152 and sets a doorbell register (not shown) of the bridge 112 to inform the solid state memory 108 that a memory access command is waiting in the submission queue 152. More specifically, the controller 144 (and/or the network interface 140) decapsulates the memory access command from a transport packet or frame, and then stores the memory access command in the submission queue 152. Generally, the solid state memory 108 reads memory access commands from the submission queue 152, and performs the memory access commands. Additionally, when the solid state memory 108 completes performance of a memory access command, the solid state memory 108 writes a completion message corresponding to the memory access command in the completion queue 156 and sets a doorbell register (not shown) of the bridge 112 to inform the bridge 112 that that a completion message is waiting in the completion queue 156.

In an embodiment, each completion queue 156 corresponds to one or more submission queues 152. Generally, each completion message corresponds to a memory access command stored in one of the submission queues 152, and the controller 144 analyzes completion messages in the one or more completion queues 156 to determine when performance of memory access commands in the one or more submission queues 152 have been completed.

In an embodiment, the controller 144 is configured to assign a respective identifier (sometimes referred to herein as a "queue identifier" or "queue ID") to each submission queue and each completion queue in the queue memory 148.

The controller 144 is configured to retrieve completion messages from the completion queue 156 and forward the completion messages to the network interface 140 for transmission to the host 14 via the network fabric 116. More specifically, the controller 144 (and/or the network interface 140) encapsulates the completion message in a packet or frame, and the network interface 140 transmits the packet or frame via the network fabric 116.

The bridge 112 further includes a buffer memory 168 that is configured to temporarily store data being transferred between the host computer 104 and the solid state memory 108. For example, in the context of a read command, data read from the solid state memory 108 is temporarily stored in the buffer memory 168 and then transferred to the host computer 104 via the network fabric 116. Similarly, in the context of a write command, data is received from the host computer 104 via the network fabric 116; temporarily stored in the buffer memory 168; and then the written to the solid state memory 108.

Although the memory 168 is illustrated in FIG. 1 as a single block, the memory 168 comprises multiple memory devices in some embodiments. In some embodiments, the queue memory 148 and at least a portion of the buffer memory 168 share one or more memory devices. In other embodiments, the queue memory 148 and the buffer memory 168 are implemented using separate memory devices. The memory 168 comprises one or more suitable storage media such as one or more of RAMs, etc.

The bridge 112 also includes a communication interface 180 that is configured to permit transfer of commands, data, etc., between the bridge 112 and the solid state memory 108 via an interconnect 184. In an embodiment, the communication interface 180 comprises a peripheral component interconnect express (PCIe) interface, and the interconnect 184 comprises a PCIe bus. In other embodiments, the communication interface 180 comprises another suitable interface such as an InfiniBand interface, and the interconnect 184 comprises another suitable interface such as an InfiniBand fabric.

The solid state memory 108 comprises a controller 188 that is configured to perform memory access commands received from the bridge 112 via the interconnect 184. In some embodiment, the controller 188 comprises an NVMe controller that is configured to operate according to the NVMe protocol. In other embodiments, the controller 188 is configured to operate according to another suitable protocol for accessing storage media such as SSDs.

In some embodiments, the processor 120 of the host computer 104 is configured to generate memory access commands that include Scatter Gather List (SGL) memory access information. SGL is a mechanism for identifying one or more noncontiguous blocks of memory locations (sometimes referred to herein as "buffers") that may have different sizes. With SGL, a set of buffers is defined as a list of buffers. Each element in the list indicates a starting memory location of a buffer, and a size of the buffer.

Generally, host computers such as the host computer 104 often access the host memory 124 in multiple noncontiguous blocks of memory locations that may have different sizes. For example, data structures used by the host processor 120 are often byte-oriented and can be spread among multiple noncontiguous blocks of memory with the physical memory 124. Thus, SGL is often well-suited for describing memory accesses made by the host computer 104.

On the other hand, many solid state memories (e.g., SSDs) are configured to access the non-volatile memory (NVM) media of the solid state memories as units of multiple memory locations, often having a size of 512 bytes, or another suitable size. The units of multiple memory locations accessed with solid state memories are sometimes referred to as logical block addresses ("LBAs"). As a result, solid state memories are often more efficient at accessing the NVM media of the solid state memories as same length buffer pages (e.g., 4 kilobytes (KB) or another suitable length). Therefore, it is often useful to access the solid state memories such as the solid state memory 108 using Physical Region Page (PRP) memory access information.

In some embodiments, the host computer 104 cannot send memory access commands with PRP memory access information via the fabric 116. For instance, NVMe-oF does not support memory access commands having PRP memory access information, but rather supports memory access commands having SGL memory access information.

Thus, it is often useful to utilize bridges that can translate SGL memory access information to PRP memory access information and/or map SGL memory accesses to PRP memory accesses.

Figure 2:
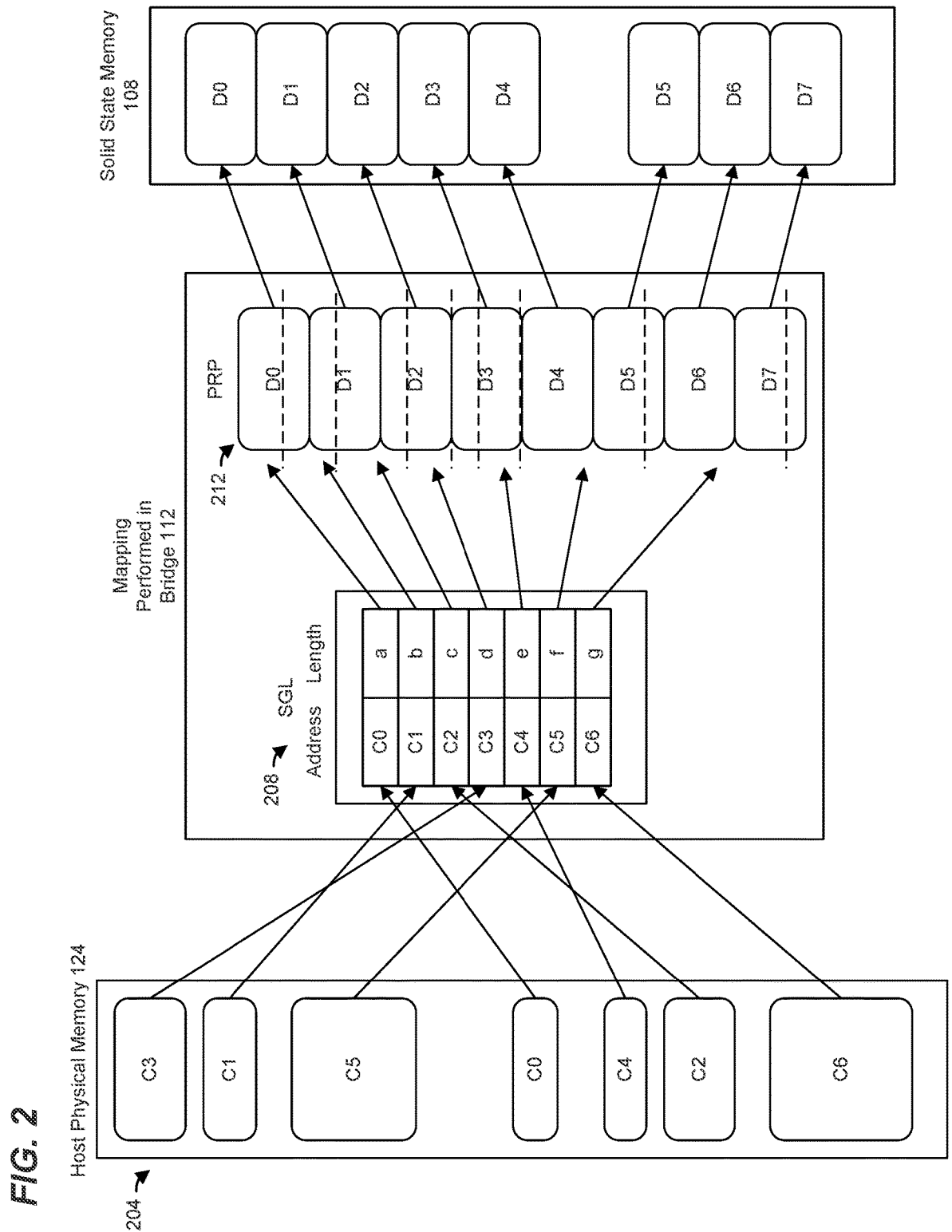
FIG. 2 is a simplified block diagram of a mapping between Scatter Gather List (SGL) memory accesses and Physical Region Page (PRP) memory accesses that the bridge of FIG. 1 is configured to perform, according to some embodiments.

FIG. 2 is a simplified block diagram of a mapping between SGL memory accesses and PRP memory accesses that the bridge 112 of FIG. 1 is configured to perform, according to some embodiments. As depicted in FIG. 2, the host computer 104 seeks to perform a memory access in connection with a plurality of blocks memory locations 204 (sometimes referred to as "SGL blocks 204") in the host memory 124 (i.e., blocks C0-C6). The SGL blocks 204 have multiple different lengths. Additionally, a logical ordering of the SGL blocks 204 does not correspond to a physical ordering of the SGL blocks 204 with respect to physical addresses of the host memory 124.

The SGL blocks 204 are specified by an SGL 208. For example, each SGL block 204 is specified by a starting physical address in the host memory 124 and a length of the SGL block 204.

The bridge 112 is configured to map the SGL 208 to a plurality of buffer pages of memory locations 212 (sometimes referred to herein as "PRP pages 212") in the solid state memory 108. Each PRP page 212 has a same length (e.g., 4 KB or another suitable length) except for a last page, i.e., D7.

Referring again to FIG. 1, the bridge 112 further comprises command modification circuitry 192. When a memory access command is read from the submission queue 152 for transfer to the solid state memory 108, the command modification circuitry 192 is configured to modify the memory access command prior to the memory access command being sent to the solid state memory 108 via the interconnect 184. In an embodiment, the command modification circuitry 192 replaces, within the memory access command, one or more indications of one or more SGL blocks 204 in the host memory 124 with one or more indications of one or more virtual blocks of memory locations that corresponds to the one or more SGL blocks 204. In other words, if the memory access command in the submission queue 152 is considered a first memory access command, the command modification circuitry 192 is configured to generate a second memory access command that is a revised copy of the first memory command, including generating the second memory access command so that the one or more indications of one or more SGL blocks 204 in the host memory 124 are replaced with one or more indications of one or more virtual blocks of memory locations that corresponds to the one or more SGL blocks 204.

The one or more indications of one or more virtual blocks of memory locations are formatted to indicate one or more PRP pages, according to an embodiment.

Figure 3:
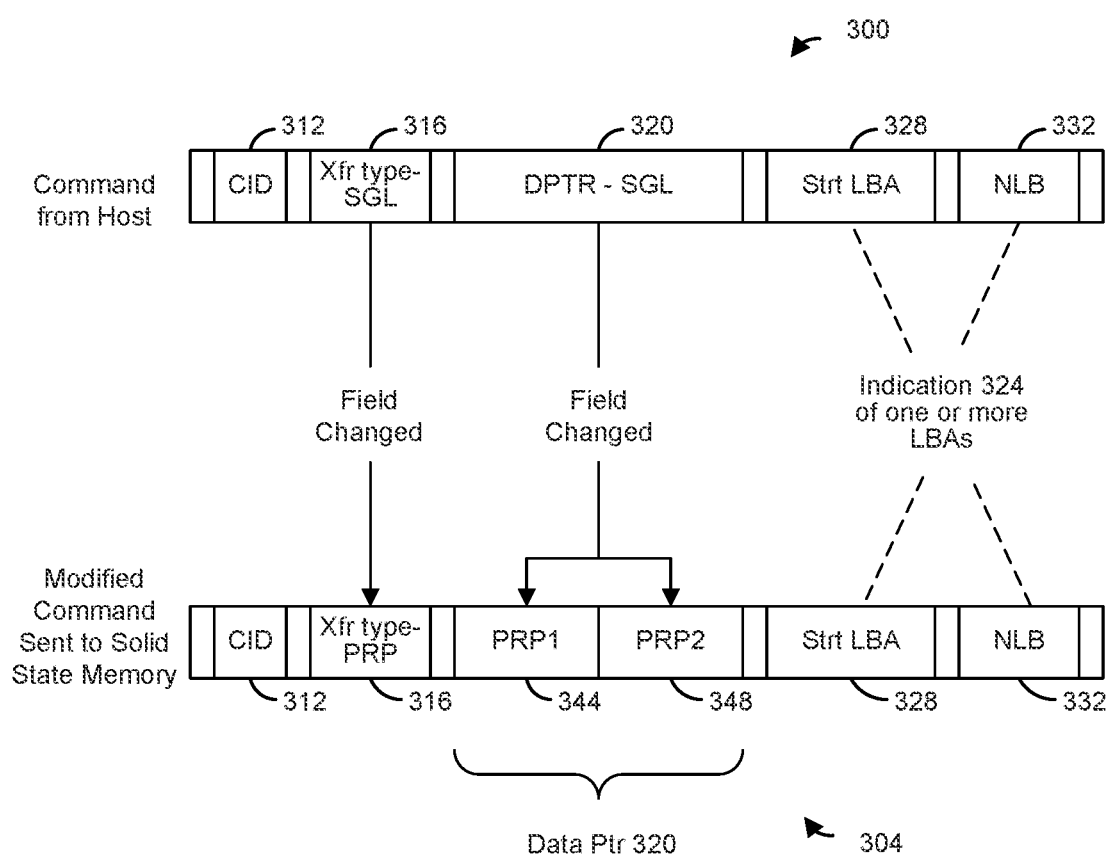
FIG. 3 is a diagram that illustrates an example of a memory access command that the bridge of FIG. 1 receives from the host computer, and a modified memory access command that the bridge sends to the solid state memory, according to an embodiment.

FIG. 3 is a diagram that illustrates an example of a memory access command 300 that the bridge 112 receives from the host computer 104 via the network fabric 116, and a modified memory access command 304 that the bridge 112 sends to the solid state memory 108 via the interconnect 184, according to an embodiment. The command modification circuitry 192 is configured to generate the modified memory access command 304 using the memory access command 300, according to an embodiment. In other embodiments, another suitable bridge different than the example bridge 112 of FIG. 1 generates the modified memory access command 304 using the memory access command 300. In other embodiments, the bridge 112 receives from the host computer 104 memory access commands having a suitable format different than the memory access command 300 and generates modified memory access commands having a suitable format different than the modified memory access command 304.

The memory access command 300 includes a command identifier (CID) field 312 that includes an identifier that uniquely identifies the memory access command 300 at least within a submission queue in which the memory access command 300 is stored, according to an embodiment. The memory access command 300 also includes a transfer type field 316 that indicates whether the memory access command 300 uses an SGL mechanism or a PRP mechanism for a data transfer associated with the memory access command 300. In NVMe, the transfer type field 316 is referred to as a "PRP or SGL for Data Transfer" field or PSDT field. In the example illustrated in FIG. 3, the transfer type field 316 is set to indicate that the memory access command 300 uses the SGL mechanism.

The memory access command 300 also includes a field 320 that indicates one or more memory blocks in the host memory 124 that are involved in a data transfer associated with the memory access command 300. In NVMe, the field 320 is referred to as a "Data Pointer" field or DPTR field. When the transfer type field 316 is set to indicate that the memory access command 300 uses the SGL mechanism, the field 320 includes an indication of one or more SGL blocks in the host memory 124 that that are involved in a data transfer associated with the memory access command 300. In NVMe, the DPTR field 320 includes an SGL descriptor when the PSDT field 316 is set to indicate that the memory access command 300 uses the SGL mechanism. The SGL descriptor indicates one or more SGL blocks in the host memory 124. If there is only one memory block in the host memory 124 that is involved in the data transfer, the SGL descriptor includes a starting address and a size of the one memory block. If there are multiple memory blocks in the host memory 124 that are involved in the data transfer, the SGL descriptor includes a pointer to of an SGL descriptors list and a size of the SGL descriptors list. Each element in the SGL descriptors list includes a starting address and a size of a respective memory block in the host memory that is involved in the data transfer.

The memory access command 300 further includes one or more fields 324 that indicate one or more logical block addresses ("LBAs") in the solid state memory 108 that are involved in the data transfer associated with the memory access command 300. For example, the memory access command 300 includes i) a field 328 that indicates a starting LBA involved in the data transfer, and ii) a field 332 that indicates a number of LBAs involved in the data transfer.

In the modified memory access command 304, the fields 312, 324, and 332 remain unchanged, according to an embodiment. On the other hand, the transfer type field 316 and the data pointer field 320 are modified by the bridge 112. In particular, the transfer type field 316 is modified to indicate that the memory access command 304 uses the PRP mechanism.

Additionally, the field 320 is modified to include an indication of one or more PRP pages that that are involved in a data transfer associated with the memory access command 304. In NVMe, the DPTR field 320 includes two fields when the PSDT field 316 is set to indicate that the memory access command 300 uses the PRP mechanism: PRP1 344 and PRP 348. When the amount of data involved in the data transfer is less than or equal to a page size (e.g., 4 KB or another suitable page size), PRP1 344 is set to a base address of a PRP page involved in the transfer, and PRP2 348 is reserved. When the amount of data involved in the data transfer is greater than the page size and less than or equal to two times the page size (e.g., 4 KB<amount of data≤8 KB), PRP1 344 is set to a base address of a first PRP page involved in the transfer, and PRP2 348 is set to a base address of a second PRP page involved in the transfer. When the amount of data involved in the data transfer is greater than twice the page size (e.g., amount of data>8 KB), PRP1 344 is set to a base address of a first PRP page involved in the transfer, and PRP2 348 includes a pointer to of a PRP page list. The PRP list indicates multiple PRP pages. For example, the PRP list includes a list of base addresses of respective PRP pages.

The indication of one or more PRP pages indicated by PRP1 344 (and optionally PRP2 348) correspond to one or more virtual addresses, in an embodiment. As will be described below in more detail, the one or more virtual addresses are generated by the bridge 112 using information that identifies the command 300 within a particular submission queue, according to an embodiment. Additionally, the bridge 112 allocates buffers in the buffer memory 168 and maps the virtual addresses to the allocated buffers. Thus, the allocated buffers in the buffer memory 168 correspond to a particular memory access command in a particular submission queue, and the bridge 112 is configured to determine how to transfer data between the allocated buffers in the buffer memory 168 and the host memory 124 using SGL information in the particular memory access command in the particular submission queue, according to some embodiments.

In an embodiment, the command modification circuitry 192 is configured to generate a first virtual address corresponding to a first PRP page according to:

$$PRP\text{-}ID \ \& \ Queue \ ID \ \& \ Capsule \ ID \ \& \ zeros \qquad \text{Equation 1}$$

where PRP-ID is a unique identifier, Queue ID is an identifier of the submission queue in which the memory allocation command from the host is stored, Capsule ID is an identifier of the memory allocation command within the submission queue, the & operator indicates a bitwise concatenation operation, and the left-hand side of Equation 1 corresponds to the most-significant bits of PRP1 344. In an embodiment, PRP1 344 has a length of 8 bytes, PRP-ID has a length of 2 bytes, Queue ID has a length of 2 bytes, Capsule ID has a length of 2 bytes, and "zeros" consists of 2 bytes of zeros. In other embodiments, PRP1 344 has a suitable length different than 8 bytes, and/or one or more of: i) PRP-ID has a suitable length different than 2 bytes, ii) Queue ID has a suitable length different than 2 bytes, iii) Capsule ID has a suitable length different than 2 bytes, and iv) "zeros" consists of a suitable number of zeros different than 2 bytes of zeros.

In an embodiment in which the PRP page size is 4 KB, the command modification circuitry 192 is configured to generate a second virtual address corresponding to a second PRP page according to:

$$PRP1+0\times1000 \qquad \text{Equation 2}$$

In an embodiment in which the PRP page size greater than 8 KB, the command modification circuitry 192 is configured to generate a list of PRP pages with respective PRP addresses, each PRP address in the list being generated according to according to:

$$PRP1+4 \ KB\_Block \ \#^*\times1000 \qquad \text{Equation 3}$$

where 4 KB_Block # is an index indicating a respective PRP page in the list.

In an embodiment, the controller 144 is configured to control the solid state memory interface 180 so that the solid state memory interface 180 maps memory accesses from the solid state memory 108 that use virtual memory addresses to physical memory buffers in the buffer memory 168 that were allocated for the memory access command. For example, the solid state memory interface 180 is configured by the controller 144 so that when the solid state memory 108 attempts to access a virtual memory address such as discussed above, the solid state memory interface 180 maps the access to a physical memory location in an allocated buffer within the buffer memory 168, according to an embodiment.

Figure 4:
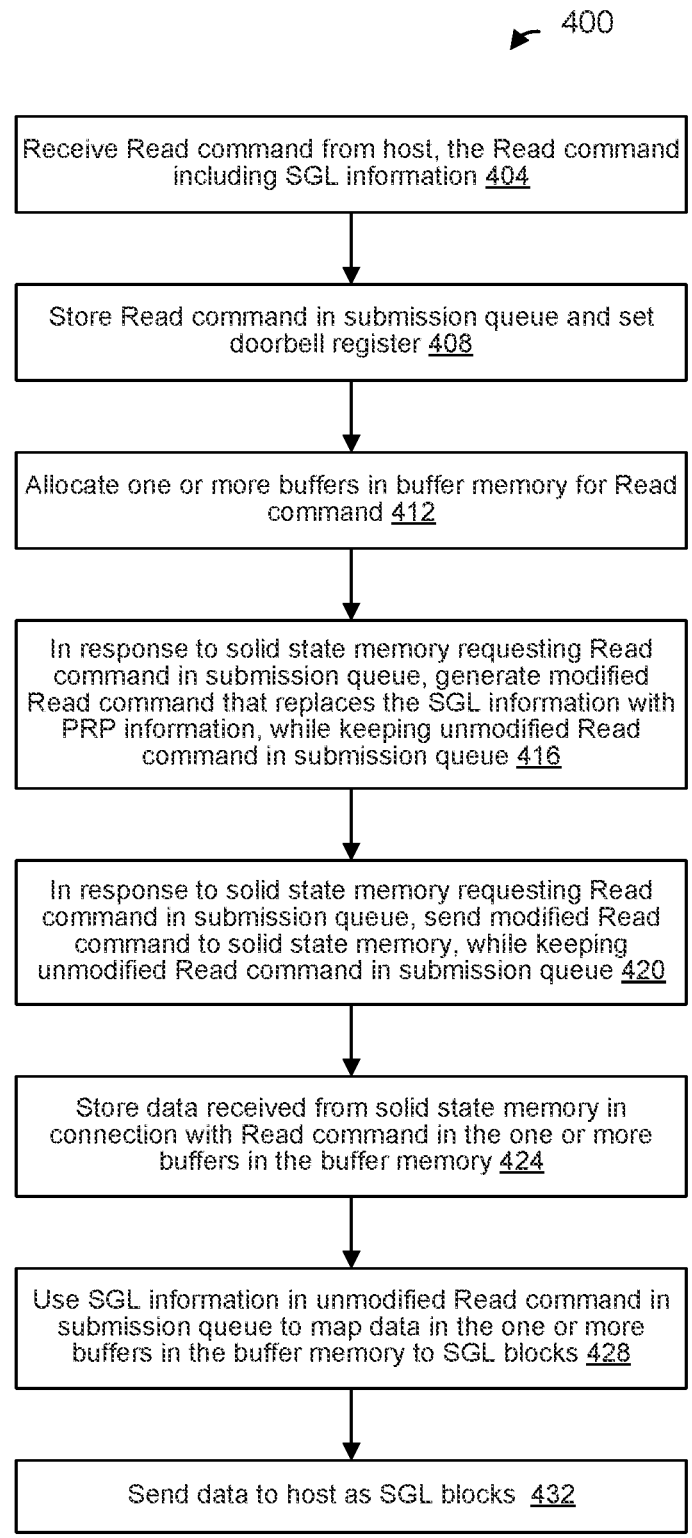
FIG. 4 is a flow diagram of an example method for reading data from a solid state memory, according to an embodiment.

FIG. 4 is a flow diagram of an example method 400 for reading data from a solid state memory, according to an embodiment. The method 400 is performed by the bridge 112 of FIG. 1, according to an embodiment, and the method 400 is described with reference to FIG. 1 for explanatory purposes. In other embodiments, the method 400 is performed by another suitable bridge device different than the bridge 112 of FIG. 1. In some embodiments, the bridge 112 performs another suitable method for reading data from the solid state memory 108 different than the method 400.

At block 404, the bridge receives a Read command from a host computer, where the Read command includes SGL information that indicates one or more SGL blocks in a memory of the host computer. The bridge receives the Read command via a network fabric, in an embodiment. For example, the network interface 140 of the bridge 112 receives a Read command from the host computer 104 via the network fabric 116.

The Read command received at block 404 has a format the same as or similar to the memory access command 300 of FIG. 3, according to an embodiment. The Read command received at block 404 has another suitable format different than the memory access command 300 of FIG. 3, according to other embodiments. The Read command received at block 404 is an NVMe Read command, according to an embodiment. The Read command received at block 404 is received by the bridge according to the NVMe-oF protocol, according to an embodiment. In various embodiments, the Read command is received at block 404 according to one of: the RDMA protocol, RoCE v1, RoCE v2, TCP/IP, iWARP, Infiniband, etc.

At block 408, the Read command received at block 404 is stored in a submission queue in a queue memory of the bridge. For example, the controller 144 stores the Read command in the submission queue 152. In an embodiment, the submission queue 152 has a unique queue ID that identifies the submission queue 152 amongst a plurality of queues (e.g., other submission queues, other submission queues and completion queues, etc.) in the queue memory 148. In an embodiment, the method 400 further comprises setting a doorbell register of the bridge to indicate to the solid state memory that a new command has been stored in the submission queue. In other embodiments, the method 400 does not include setting a doorbell register.

At block 412, the bridge allocates one or more buffers in a buffer memory of the bridge for the Read command received at block 404. For example, the controller 144 allocates one or more buffers in the buffer memory 168 for the Read command received at block 404.

In some embodiments, the aggregate size of the one or more buffers allocated at block 412 is less than the aggregate size of the SGL blocks indicated by the Read command received at block 404. For example, as will be described further below, the bridge (e.g., the bridge 112) begins sending data read from the solid state memory in connection with the Read command prior to all of the data in connection with the Read command has been read from the solid state memory, in some embodiments. In some such embodiments, when data in a buffer has been sent to the host computer but all of the data in connection with the Read command has not yet been read from the solid state memory, the buffer is overwritten with new data read from the solid state memory in connection with the Read command. Therefore, in some such embodiments, the aggregate size of the one or more buffers allocated at block 412 can be less than the aggregate size of the SGL blocks indicated by the Read command received at block 404.

In some embodiments, the aggregate size of the one or more buffers allocated at block 412 at any one time is less than the aggregate size of the SGL blocks indicated by the Read command received at block 404. For example, as will be described further below, the bridge (e.g., the bridge 112) begins sending data read from the solid state memory in connection with the Read command prior to all of the data in connection with the Read command has been read from the solid state memory, in some embodiments. In some such embodiments, buffers are allocated at block 412 over time; and when data in a buffer has been sent to the host computer but all of the data in connection with the Read command has not yet been read from the solid state memory, the buffer is deallocated. Therefore, in some such embodiments, the aggregate size of the one or more buffers allocated at block 412 at any one time can be less than the aggregate size of the SGL blocks indicated by the Read command received at block 404. As a result, a size of the buffer memory 168 is significantly reduced as compared to other types of bridge devices, at least in some embodiments.

At block 416, in response to the solid state memory requesting the Read command in the submission queue, the bridge generates a modified Read command that replaces the SGL information in Read command received at block 404 with PRP information. For example, the Read command received at block 404 has a format the same as or similar to the memory access command 300 of FIG. 3 and the modified Read command generated at block 416 has a format the same as or similar to the modified memory access command 304 of FIG. 3, according to an embodiment. The modified Read command generated at block 416 has another suitable format different than the modified memory access command 304 of FIG. 3, according to other embodiments.

In an embodiment, generating the modified Read command at block 416 includes generating the modified Read command while keeping the Read command received at block 404 in the submission queue.

In an embodiment, block 416 includes generating the modified Read command so that a transfer type field of the Read command received at block 404 is modified from indicating an SGL-type transfer to indicating a PRP-type transfer. In an embodiment, block 416 additionally includes generating the modified Read command so that a data pointer field of the Read command received at block 404 is modified from indicating one or more SGL blocks to indicating one or more PRP pages. In an embodiment, block 416 includes generating the modified Read command so that the data pointer field of the Read command received at block 404 is modified from indicating one or more SGL blocks to indicating one or more virtual addresses that correspond to one or more respective PRP pages.

In some embodiments, in which modified Read command indicates one or more virtual addresses that correspond to one or more respective PRP pages, the virtual addresses are generated using information that indicates a location of the Read command received at block 404 within the queue memory. For example, as discussed with reference to FIG. 3, virtual addresses are generated using an identifier of a submission queue in which the Read command is stored (e.g., Queue ID) and an identifier of a Read command within the submission queue (e.g., Capsule ID), according to an embodiment. The virtual addresses are generated also using a unique identifier (e.g., PRP ID), according to another embodiment.

In some embodiments in which modified Read command indicates one or more virtual addresses that correspond to one or more respective PRP pages, the method 400 further comprises configuring a communication interface (e.g., the solid state memory interface 180) of the bridge to map the one or more virtual addresses to the one or more one or more buffers allocated at block 412. For example, the controller 144 configures the solid state memory interface 180 to map the one or more virtual addresses to the one or more one or more buffers in the buffer memory 168 allocated at block 412.

At block 420, also in response to the solid state memory requesting the Read command in the submission queue, the bridge sends the modified Read command to the solid state memory. For example, the modified Read command is sent to the solid state memory 108 via the solid state memory interface 180. In an embodiment, sending the modified Read command at block 420 includes sending the modified Read command to the solid state memory while keeping the Read command received at block 404 in the submission queue.

At block 424, the bridge stores data received from the solid state memory in the one or more buffers allocated at block 412, the data received at block 424 corresponding to the solid state memory performing the modified Read command sent to the solid state memory at block 420. In an embodiment in which the method 400 includes configuring the communication interface of the bridge to map the one or more virtual addresses to the one or more one or more buffers allocated at block 412, block 424 includes the communication interface (e.g., the solid state memory interface 180) storing data received at block 424 in the one or more buffers according to a mapping between the one or more virtual addresses and the one or more one or more buffers.

At block 428, the bridge uses SGL information in the Read command stored in the submission queue at block 408 to map data stored in the one or more buffers at block 424 to one or more SGL blocks indicated by the SGL information in the Read command. For example, the controller 144 uses SGL information in the Read command stored in the submission queue 152 to map data stored in one or more buffers in the buffer memory 168 to one or more SGL blocks indicated by the SGL information in the Read command. In some embodiments in which virtual addresses are generated using information that indicates a location of the Read command received at block 404 within the queue memory, the controller 144 uses the virtual addresses to determine the location of the Read command within the queue memory 148. For example, as discussed above, the virtual addresses include an identifier of a submission queue in which the Read command is stored (e.g., Queue ID) and an identifier of a Read command within the submission queue (e.g., Capsule ID), according to an embodiment.

In some embodiments in which virtual addresses are generated using information that indicates a location of the Read command received at block 404 within the queue memory and in which the virtual addresses are mapped to buffers in the buffer memory 168, the controller 144 uses the locations of the buffers in the buffer memory 168 to determine the location of the Read command within the queue memory 148. For example, the locations of the buffers are mapped to the virtual addresses, and the virtual addresses include an identifier of a submission queue in which the Read command is stored (e.g., Queue ID) and an identifier of a Read command within the submission queue (e.g., Capsule ID), according to an embodiment.

At block 432, the bridge sends data that was stored in the one or more buffers at block 424 to the host computer as one or more SGL blocks as indicated by the Read command stored in the queue. For example, the controller 144 sends the data as SGL blocks to the host computer 104 via the network interface 140 and the network fabric 116. The data sent at block 432 is sent by the bridge according to the NVMe-oF protocol, according to an embodiment. In various embodiments, the data is sent at block 432 according to one of: the RDMA protocol, RoCE v1, RoCE v2, TCP/IP, iWARP, Infiniband, etc.

Figure 5:
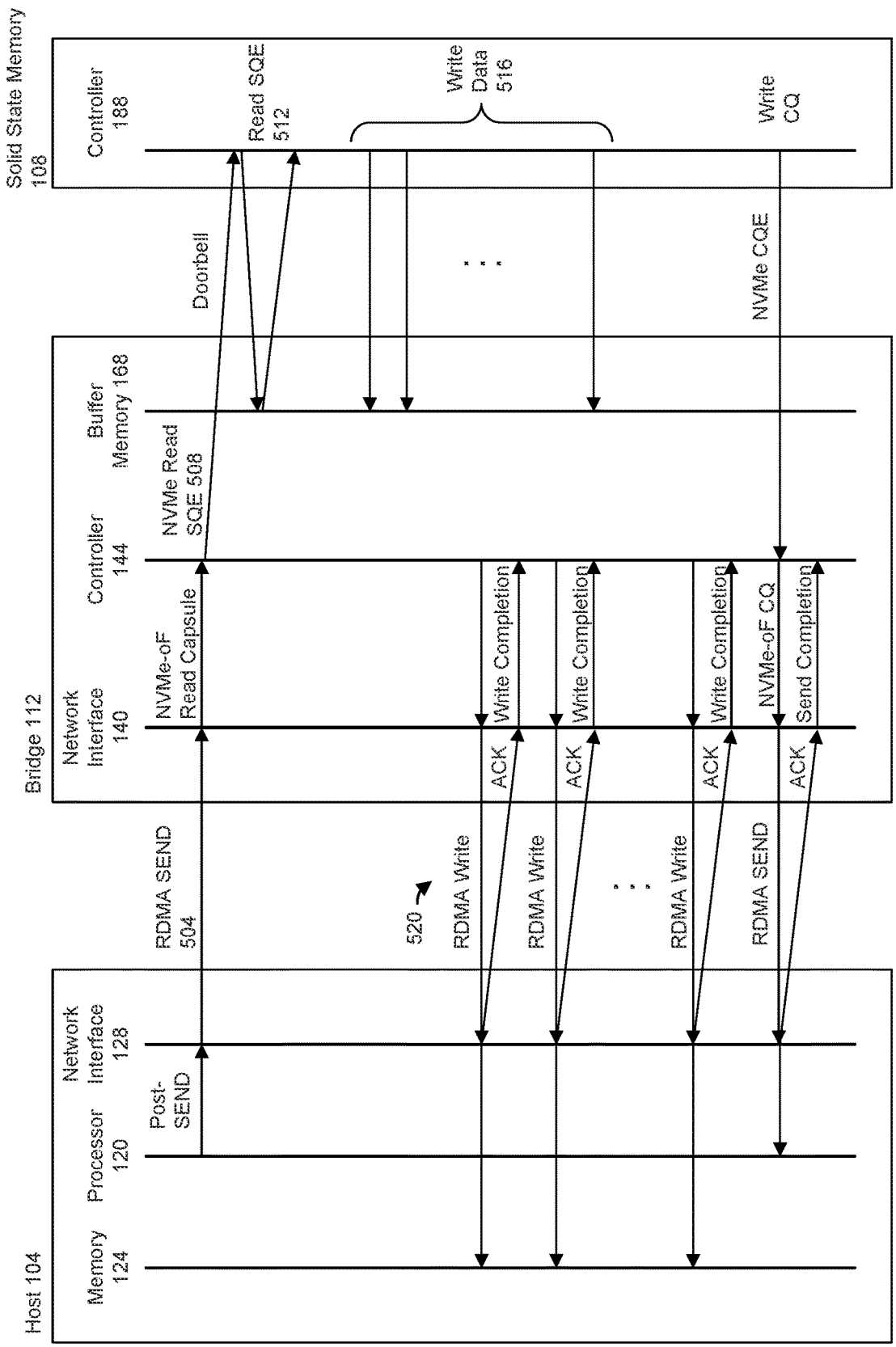
FIG. 5 is a simplified data transfer diagram that illustrates an example of reading data from a solid state memory, according to an embodiment.

FIG. 5 is a simplified data transfer diagram that illustrates an example of reading data from a solid state memory, according to an embodiment. In FIG. 5, time increases from top to bottom.

The data transfer illustrated in FIG. 5 is performed by the example storage network 100 of FIG. 1, according to an embodiment, and FIG. 5 is described with reference to FIG. 1 for explanatory purposes. In other embodiments, the data transfer illustrated in FIG. 5 is performed by another suitable storage network different than the example storage network 100 of FIG. 1. In some embodiments, the example storage network 100 of FIG. 1 performs another suitable sequence of data transfers for reading data from the solid state memory 108 different than the data transfers illustrated in FIG. 5.

The data transfer illustrated in FIG. 5 is an example implementation of the method 400, in an embodiment, and is described with reference to FIG. 4 for explanatory purposes. Other implementations of the method 400 involve other suitable sequences of data transfers for reading data from the solid state memory 108 different than the data transfers illustrated in FIG. 5.

The bridge 112 receives a Send message (504) via the network fabric 116 according to NVMe-oF and one or more of the RDMA protocol, RoCE v1, RoCE v2, etc. The Send message includes a Read command, and receipt of the Send message by the bridge 112 corresponds to block 404 of the method 400.

The bridge 112 stores the Read command in a submission queue (508) in the queue memory 148. Storing the Read command in the submission queue (508) corresponds to block 408 of the method 400.

The solid state memory 108 then requests the Read command from the submission queue and receives a modified Read command from the bridge (512). Receiving the modified Read command from the bridge (512) corresponds to block 420 of the method 400.

The solid state memory 108 then executes the modified Read command by reading data from the NVM and writing the data to the buffer memory 168 in a series of write operations (516). In an embodiment, each write operation (516) corresponds to a direct memory access (DMA) write operation. The series of write operations (516) corresponds to block 424 of the method 400. The series of write operations (516) uses virtual addresses indicated by the modified Read command.

Prior to the series of write operations (516) by the solid state memory 108 completing, the bridge 112 retrieves data that was already written to the buffer memory 168 by the solid state memory in connection with the Read command; maps the data to SGL blocks; and sends the SGL blocks to the host computer 104 in a series of write messages (520) according to NVMe-oF and one or more of the RDMA protocol, RoCE v1, RoCE v2, etc. The sending of the series of write messages (520) corresponds to block 432 of the method 400.

As illustrated in FIG. 5, the bridge 112 begins sending data that was read from the solid state memory 108 to the host computer 104 before all of the data has been read from the solid state memory 108. As discussed above, this permits one or both of i) the total aggregate size of buffers allocated by the bridge 112 for the Read command to be less than the aggregate size of the SGL blocks indicated by the Read command, and ii) the aggregate size of buffers allocated by the bridge 112 for the Read command at any one time to be less than the aggregate size of the SGL blocks indicated by the Read command. As a result, a size of the buffer memory 168 is significantly reduced as compared to other types of bridge devices, at least in some embodiments.

Additionally or alternatively, because the bridge 112 begins sending data that was obtained from the solid state memory 108 in connection with the Read command to the host computer 104 before all of the data corresponding to the Read command has been obtained from the solid state memory 108, the latency associated with the Read command is reduced as compared to bridge devices that begin sending data that was obtained from a solid state memory in connection with a Read command to a host computer only after the bridge has obtained all of the data corresponding to the Read command from the solid state memory. In some embodiments, latency associated with a Read command is in the single microseconds or even in the tens of nanoseconds, as compared to other types of bridge devices in which the latency associated with a Read command is in the hundreds of milliseconds or higher.

In other embodiments, the bridge 112 begins sending data that was obtained from the solid state memory 108 in connection with a Read command to the host computer 104 only after the bridge 112 has obtained all of the data corresponding to the Read command from the solid state memory 108.

Figure 6:
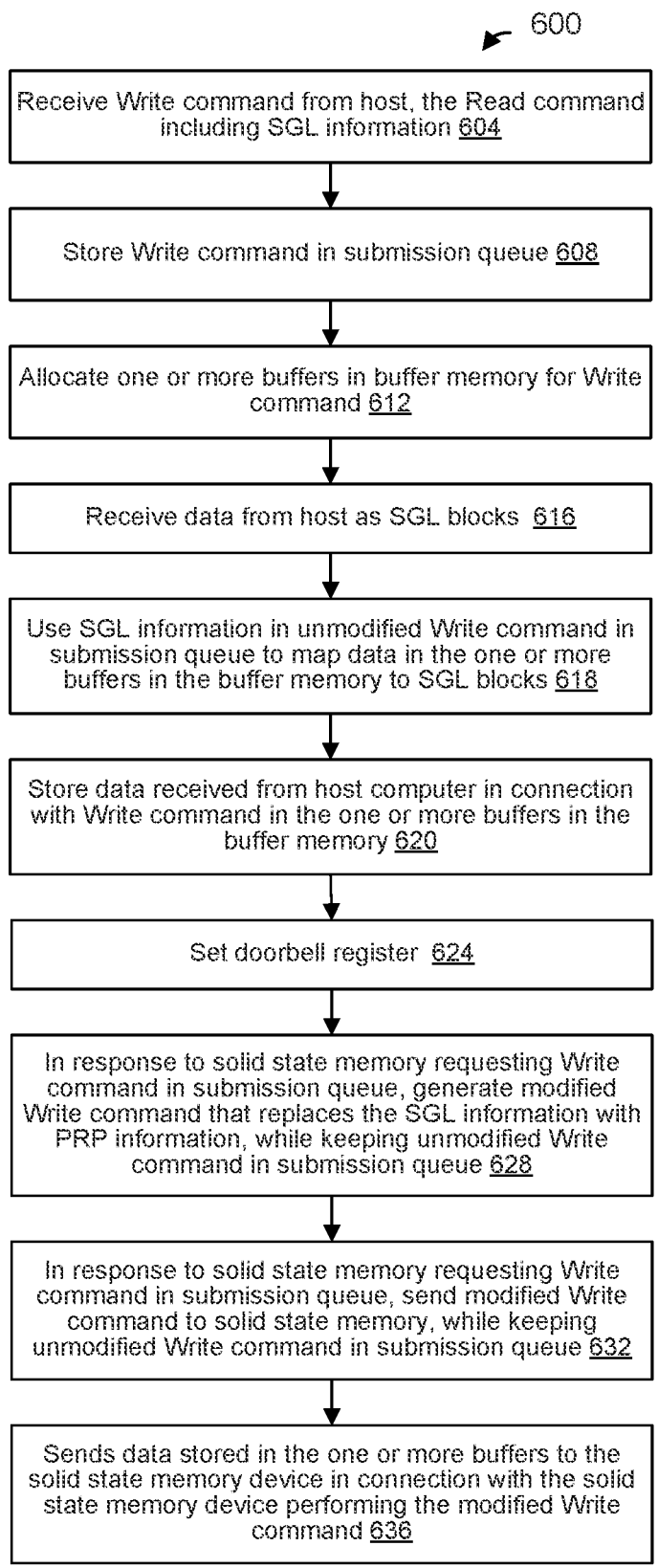
FIG. 6 is a flow diagram of an example method for writing data to a solid state memory, according to an embodiment.

FIG. 6 is a flow diagram of an example method 600 for writing data to a solid state memory, according to an embodiment. The method 600 is performed by the bridge 112 of FIG. 1, according to an embodiment, and the method 600 is described with reference to FIG. 1 for explanatory purposes. In other embodiments, the bridge 112 does not perform the method 600 but rather performs another suitable method for writing data to the solid state memory 108. In some embodiments, the method 600 is performed by another suitable bridge device different than the bridge 112 of FIG. 1.

At block 604, the bridge receives a Write command from a host computer, where the Write command includes SGL information that indicates one or more SGL blocks in a memory of the host computer. The bridge receives the Write command via a network fabric, in an embodiment. For example, the network interface 140 of the bridge 112 receives a Write command from the host computer 104 via the network fabric 116.

The Write command received at block 604 has a format the same as or similar to the memory access command 300 of FIG. 3, according to an embodiment. The Write command received at block 604 has another suitable format different than the memory access command 300 of FIG. 3, according to other embodiments. The Write command received at block 604 is an NVMe Write command, according to an embodiment. The Write command received at block 604 is received by the bridge according to the NVMe-oF protocol, according to an embodiment. In various embodiments, the Write command is received at block 604 according to one of the RDMA protocol, RoCE v1, RoCE v2, TCP/IP, iWARP, Infiniband, etc.

At block 608, the Write command received at block 604 is stored in a submission queue in a queue memory of the bridge. For example, the controller 144 stores the Write command in the submission queue 152. In an embodiment, the submission queue 152 has a unique queue ID that identifies the submission queue 152 amongst a plurality of queues (e.g., other submission queues, other submission queues and completion queues, etc.) in the queue memory 148. In an embodiment, the method 600 further comprises setting a doorbell register of the bridge to indicate to the solid state memory that a new command has been stored in the submission queue. In other embodiments, the method 600 does not include setting a doorbell register.

At block 612, the bridge allocates one or more buffers in a buffer memory of the bridge for the Write command received at block 604. For example, the controller 144 allocates one or more buffers in the buffer memory 168 for the Write command received at block 604.

In some embodiments, the aggregate size of the one or more buffers allocated at block 612 is less than the aggregate size of the SGL blocks indicated by the Write command received at block 604. For example, as will be described further below, the bridge (e.g., the bridge 112) prompts the solid state memory to begin reading data from the buffer memory of the bridge in connection with the Write command prior to all of the data in connection with the Write command having been received from the host computer, in some embodiments. In some such embodiments, when data in a buffer has been sent to the solid state memory but all of the data in connection with the Write command has not yet been stored in the solid state memory, the buffer is overwritten with new data from the host computer in connection with the Write command. Therefore, in some such embodiments, the aggregate size of the one or more buffers allocated at block 612 can be less than the aggregate size of the SGL blocks indicated by the Write command received at block 604.

In some embodiments, the aggregate size of the one or more buffers allocated at block 612 at any one time is less than the aggregate size of the SGL blocks indicated by the Write command received at block 604. For example, as will be described further below, the bridge (e.g., the bridge 112) prompts the solid state memory to begin reading data from the buffer memory of the bridge in connection with the Write command prior to all of the data in connection with the Write command having been received from the host computer, in some embodiments. In some such embodiments, buffers are allocated at block 612 over time; and when data in a buffer has been sent to the solid state memory but all of the data in connection with the Write command has not yet been stored in the solid state memory, the buffer is deallocated. Therefore, in some such embodiments, the aggregate size of the one or more buffers allocated at block 612 at any one time can be less than the aggregate size of the SGL blocks indicated by the Write command received at block 604.

At block 616, the bridge receives data from the host computer corresponding to the Write command received at block 604. For example, the controller 144 receives the data as SGL blocks from the host computer 104 via the network interface 140 and the network fabric 116. The data received at block 616 is received by the bridge according to the NVMe-oF protocol, according to an embodiment. In various embodiments, the data is received at block 616 according to one of: the RDMA protocol, RoCE v1, RoCE v2, TCP/IP, iWARP, Infiniband, etc.

At block 618, the bridge uses SGL information in the Write command stored in the submission queue at block 608 to map one or more SGL blocks indicated by the SGL information in the Write command to the one or more buffers allocated at block 612. For example, the controller 144 uses SGL information in the Write command stored in the submission queue 152 to map one or more SGL blocks indicated by the SGL information in the Write command to the one or more buffers allocated at block 612.

In some embodiments, the mapping of the SGL blocks to the one or more buffers corresponds to a mapping between one or more virtual addresses and the one or more one or more buffers. For example, as discussed above, the virtual addresses include an identifier of a submission queue in which the Write command is stored (e.g., Queue ID) and an identifier of a Write command within the submission queue (e.g., Capsule ID), according to an embodiment. In some embodiments, the locations of the buffers in the buffer memory 168 are related to the location of the Write command within the queue memory 148. For example, the locations of the buffers are mapped to the virtual addresses, and the virtual addresses include an identifier of a submission queue in which the Write command is stored (e.g., Queue ID) and an identifier of a Write command within the submission queue (e.g., Capsule ID), according to an embodiment.

At block 620, the bridge stores data received from the host computer at block 616 in the one or more buffers allocated at block 612, the data received at block 620 corresponding to the Write command received at block 604. Storing the data in the one or more buffers at block 620 includes storing the data in the one or more buffers according to the mapping between the SGL blocks and the one or more buffers, according to an embodiment.

At block 624, the bridge prompts the solid state memory to request the Write command in the submission queue. For example, the controller 144 sets a doorbell register of the bridge 112 to indicate to the solid state memory 108 that a new command has been stored in the submission queue.

At block 628, in response to the solid state memory requesting the Write command in the submission queue, the bridge generates a modified Write command that replaces the SGL information in Write command received at block 604 with PRP information. For example, the Write command received at block 604 has a format the same as or similar to the memory access command 300 of FIG. 3 and the modified Write command generated at block 628 has a format the same as or similar to the modified memory access command 304 of FIG. 3, according to an embodiment. The modified Write command generated at block 628 has another suitable format different than the modified memory access command 304 of FIG. 3, according to other embodiments.

In an embodiment, generating the modified Write command at block 628 includes generating the modified Write command while keeping the Write command received at block 604 in the submission queue.

In an embodiment, block 628 includes generating the modified Write command so that a transfer type field of the Write command received at block 604 is modified from indicating an SGL-type transfer to indicating a PRP-type transfer. In an embodiment, block 628 additionally includes generating the modified Write command so that a data pointer field of the Write command received at block 604 is modified from indicating one or more SGL blocks to indicating one or more PRP pages. In an embodiment, block 628 includes generating the modified Write command so that the data pointer field of the Write command received at block 604 is modified from indicating one or more SGL blocks to indicating one or more virtual addresses that correspond to one or more respective PRP pages.

In some embodiments in which modified Write command indicates one or more virtual addresses that correspond to one or more respective PRP pages, the virtual addresses are generated using information that indicates a location of the Write command received at block 604 within the queue memory. For example, as discussed with reference to FIG. 3, virtual addresses are generated using an identifier of a submission queue in which the Read command is stored (e.g., Queue ID) and an identifier of a Read command within the submission queue (e.g., Capsule ID), according to an embodiment. The virtual addresses are generated also using a unique identifier (e.g., PRP ID), according to another embodiment.

In some embodiments in which modified Write command indicates one or more virtual addresses that correspond to one or more respective PRP pages, the method 600 further comprises configuring a communication interface (e.g., the solid state memory interface 180) of the bridge to map the one or more virtual addresses to the one or more one or more buffers allocated at block 612. For example, the controller 144 configures the solid state memory interface 180 to map the one or more virtual addresses to the one or more one or more buffers in the buffer memory 168 allocated at block 612.

At block 632, also in response to the solid state memory requesting the Write command in the submission queue, the bridge sends the modified Write command to the solid state memory. For example, the modified Write command is sent to the solid state memory 108 via the solid state memory interface 180. In an embodiment, sending the modified Write command at block 632 includes sending the modified Write command to the solid state memory while keeping the Write command received at block 604 in the submission queue.

At block 636, the bridge sends data stored in the one or more buffers to the solid state memory device in connection with the solid state memory device performing the modified Write command. For example, in response to receiving one or more read requests from the solid state memory that include virtual addresses indicated by the modified write command, the bridge sends data stored in the one or more buffers allocated at block 612 to the solid state memory device via the communication interface (e.g., the solid state memory interface 180). In an embodiment in which the method 600 includes configuring the communication interface of the bridge to map the one or more virtual addresses to the one or more one or more buffers allocated at block 612, block 636 includes the communication interface (e.g., the solid state memory interface 180) retrieving data received from the one or more buffers according to a mapping between the one or more virtual addresses in the read requests from the solid state memory and the one or more one or more buffers.

Figure 7:
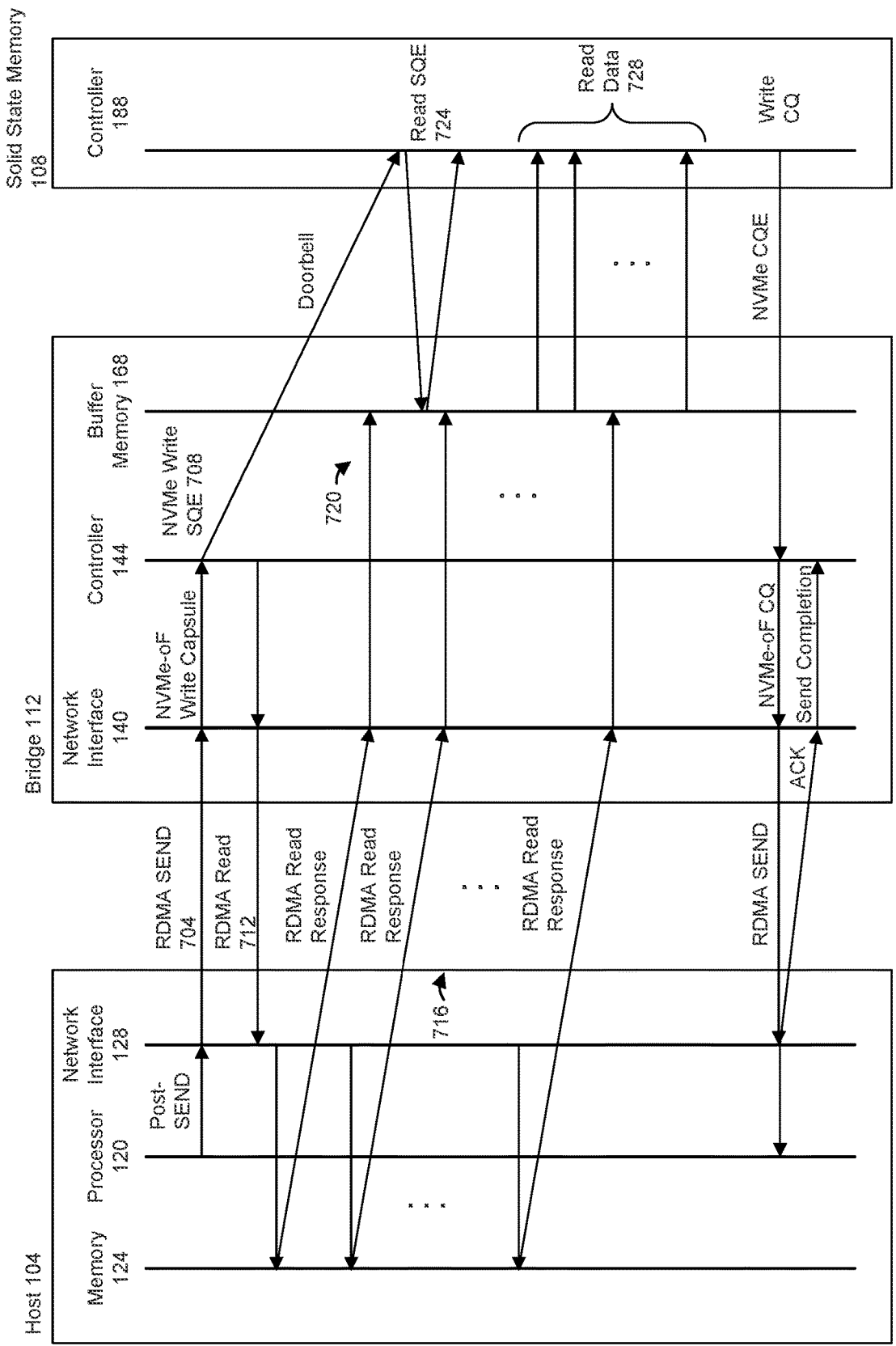
FIG. 7 is a simplified data transfer diagram that illustrates an example of writing data to a solid state memory, according to an embodiment.

FIG. 7 is a simplified data transfer diagram that illustrates an example of writing data to a solid state memory, according to an embodiment. In FIG. 7, time increases from top to bottom.

The data transfer illustrated in FIG. 7 is performed by the example storage network 100 of FIG. 1, according to an embodiment, and FIG. 7 is described with reference to FIG. 1 for explanatory purposes. In other embodiments, the data transfer illustrated in FIG. 7 is performed by another suitable storage network different than the example storage network 100 of FIG. 1. In some embodiments, the example storage network 100 of FIG. 1 does not perform the data transfers illustrated in FIG. 7, but rather performs another suitable sequence of data transfers for writing data to the solid state memory 108.

The data transfer illustrated in FIG. 7 is an example implementation of the method 600, in an embodiment, and is described with reference to FIG. 6 for explanatory purposes. Other implementations of the method 600 involve other suitable sequences of data transfers for writing data to the solid state memory 108 different than the data transfers illustrated in FIG. 7.

The bridge 112 receives a Send message (704) via the network fabric 116 according to NVMe-oF and one or more of the RDMA protocol, RoCE v1, RoCE v2, etc. The Send message includes a Write command, and receipt of the Send message by the bridge 112 corresponds to block 604 of the method 600.

The bridge 112 stores the Write command in a submission queue (708) in the queue memory 148. Storing the Write command in the submission queue (708) corresponds to block 608 of the method 600.

In response to receiving the Write command, the bridge 112 prompts the host computer 104 to transfer, via the network fabric 116, data that is to be written to the solid state memory 108. For example, the bridge 112 sends an RDMA Read message (712) that indicates the SGL blocks indicated in the Write command that was previous received (704). The bridge 112 sends the RDMA Read message (712) via the network fabric 116 according to NVMe-oF and one or more of the RDMA protocol, RoCE v1, RoCE v2, etc.

In response to the RDMA Read message 712, the host computer 104 sends a series of RDMA Read Response messages (716) according to NVMe-oF protocol and one or more of the RDMA protocol, RoCE v1, RoCE v2, etc. The RDMA Read Response messages (716) include SGL blocks of data corresponding to the Write command (704). The bridge 112 receiving the RDMA Read Response messages (716) corresponds to block 616 of the method 600.

The bridge 112 performs a series of writes (720) of the SGL blocks of data corresponding to the Write command (704) to the buffer memory 168. The writing (720) of the SGL blocks of data corresponds to block 620 of the method 600.

After the series of writes (720) of the SGL blocks of data to the buffer memory 168 has begun, the bridge 112 sets a doorbell register to prompt the solid state memory 108 to request the Write command from the submission queue. Then, the solid state memory 108 requests the Write command from the submission queue and receives a modified Write command from the bridge (724). Receiving the modified Write command from the bridge (724) corresponds to block 628 of the method 600.

The solid state memory 108 then executes the modified Write command by reading data from the buffer memory 168 in the bridge 112 in a series of read operations (728), and writing the data to the NVM of the solid state memory. In an embodiment, each read operation (728) corresponds to a DMA read operation. The series of read operations (728) corresponds to block 636 of the method 600. The series of read operations (728) uses virtual addresses indicated by the modified Write command.

As illustrated in FIG. 7, the bridge 112 begins sending data to the solid state memory 108 before all of the data has been received from the host computer 104. As discussed above, this permits one or both of i) the total aggregate size of buffers allocated by the bridge 112 for the Write command to be less than the aggregate size of the SGL blocks indicated by the Write command, and ii) the aggregate size of buffers allocated by the bridge 112 for the Write command at any one time to be less than the aggregate size of the SGL blocks indicated by the Write command.

Additionally or alternatively, because the bridge 112 begins sending data that was obtained from the host computer 104 in connection with the Write command to the solid state memory 108 before all of the data corresponding to the Write command has been obtained from the host computer 104, the latency associated with the Write command is reduced as compared to bridge devices that begin sending data that was obtained from a host computer in connection with a Write command to a solid state memory only after the bridge has obtained all of the data corresponding to the Write command from the host computer.

In other embodiments, the bridge 112 begins sending data that was obtained from the host computer in connection with a Write command to the solid state memory 108 only after the bridge 112 has obtained all of the data corresponding to the Write command from the host computer.

As discussed above, in some embodiments the bridge 112 is configured to perform the example method 400 for reading data from a solid state memory (or a similar method) but does not perform the example method 600 for writing data to the solid state memory. For example, the bridge 112 is configured to perform a conventional method for writing data to the solid state memory, in some embodiments. In many typical applications, data is read from SSDs much more frequently than data is written to the SSDs. As an illustrative example, when a picture is uploaded to a cloud storage service, the picture is written once to an SSD but is typically read (downloaded) many times. Additionally, typical SSD memories are physically limited to a number of lifetime writes but are physically capable of many more reads over a lifetime. As a result, SSDs are typically used in applications in which data will be read from the SSD much more frequently than data is written to the SSD. Therefore, in some embodiments in which SSD writes are performed much less frequently than SSD reads, benefits of the example method 600 for writing data to a solid state memory may not outweigh costs of implementation; whereas the example method 400 for reading data from a solid state memory (or a similar method) provides significant benefits, as discussed above.

Figure 8:
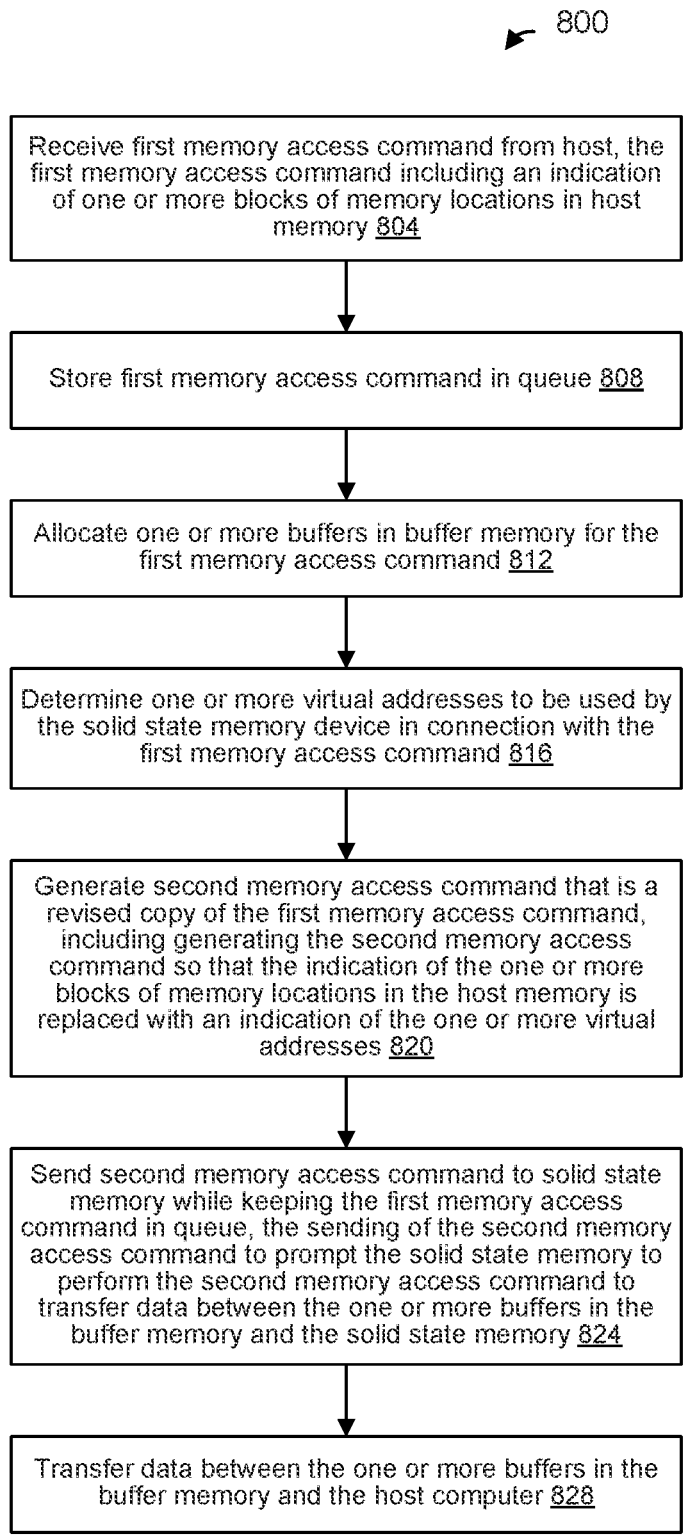
FIG. 8 is a flow diagram of an example method for transferring data between a solid state memory and a host computer, according to an embodiment.

FIG. 8 is a flow diagram of an example method 800 for transferring data between a solid state memory and a host computer, according to an embodiment. The method 800 is performed by the bridge 112 of FIG. 1, according to an embodiment, and the method 800 is described with reference to FIG. 1 for explanatory purposes. In other embodiments, the method 800 is performed by another suitable bridge device different than the bridge 112 of FIG. 1. In some embodiments, the bridge 112 performs another suitable method for transferring data between the host computer 104 and a solid state memory 108 different than the method 800.

At block 804, a bridge receives a first memory access command from the host computer, where the first memory access command indicates a memory operation to be performed by the solid state drive and includes an indication of one or more blocks of memory locations in a host memory of the host computer. For example, the bridge 112 receives a Read command, a Write command, etc., from the host computer 104 via the network fabric 116. In an embodiment, the first memory access command includes SGL information that indicates one or more SGL blocks in the host memory. In an embodiment, the bridge receives the first memory access command via a network fabric. In an embodiment, the first memory access command corresponds to reading data from the solid state memory. In another embodiment, the first memory access command corresponds to writing data to the solid state memory.

At block 808, the bridge device stores the first memory access command in a queue of the bridge device. For example, the controller 144 stores the first memory access command in the submission queue 152.

At block 812, the bridge allocates one or more buffers in a buffer memory of the bridge for the first memory access command. For example, the controller 144 allocates one or more buffers in the buffer memory 168.

At block 816, the bridge determines one or more virtual addresses to be used by the solid state memory in connection with the first memory access command. In an embodiment, the command modification circuitry 192 determines the one or more virtual addresses. In another embodiment, the controller 144 determines the one or more virtual addresses. Determining the one or more virtual addresses at block 816 comprises determining the one or more virtual addresses using an indication of a location of the first memory access command within the queue, according to an embodiment. Determining the one or more virtual addresses at block 816 additionally or alternatively comprises determining the one or more virtual addresses using an identifier of the queue, according to another embodiment.

In an embodiment, the one or more virtual addresses determined at block 816 correspond to one or more PRP pages.

At block 820, the bridge generates a second memory access command that is a revised copy of the first memory access command. The second memory access command is generated so that the indication of the one or more blocks of memory locations in the host memory is replaced with an indication of the one or more virtual addresses determined at block 816. In an embodiment, the command modification circuitry 192 generates the second memory access command.

In an embodiment, first memory access command received at block 804 has a format the same as or similar to the memory access command 300 of FIG. 3, and the second memory access command generated at block 820 has a format the same as or similar to the modified memory access command 304 of FIG. 3, according to an embodiment. The first memory access command and/or the second memory access command have suitable format(s) different than the memory access command 300 and the modified memory access command 304, respectively, of FIG. 3, according to other embodiments.

At block 824, the bridge sends the second memory access command to the solid state memory while keeping the first memory access command in the queue. Sending the second memory access command to the solid state memory prompts the solid state memory to perform the second memory access command to transfer data between the one or more buffers allocated at block 812 and the solid state memory. Sending the second memory access command to the solid state memory at block 824 includes sending the second memory access command to the solid state memory via a PCIe interconnect, according to an embodiment.

In an embodiment, the sending the second memory access command to the solid state memory at block 824 prompts the solid state memory to perform the second memory access command to transfer data between the one or more buffers and the solid state memory as discussed with reference to FIG. 5. In another embodiment, the sending the second memory access command to the solid state memory at block 824 prompts the solid state memory to perform the second memory access command to transfer data between the one or more buffers and the solid state memory as discussed with reference to FIG. 7.

At block 828, the bridge transfers data between the one or more buffers in the buffer memory and the host computer. In an embodiment, the sending the second memory access command to the solid state memory at block 824 prompts the solid state memory to perform the second memory access command to transfer data between the one or more buffers and the solid state memory as discussed with reference to FIG. 5. In another embodiment, the sending the second memory access command to the solid state memory at block 824 prompts the solid state memory to perform the second memory access command to transfer data between the one or more buffers and the solid state memory as discussed with reference to FIG. 7.

At least some of the various blocks, operations, and techniques described above are suitably implemented utilizing a processor executing machine-readable instructions and/or dedicated hardware circuitry, such as one or more of discrete components, an integrated circuit (IC), an application specific IC (ASIC), a programmable logic device (PLD), a processor executing firmware instructions, or any combination thereof. When implemented utilizing a processor executing software or firmware instructions, the software or firmware instructions may be stored in any suitable computer readable memory such as in a random access memory (RAM), a read-only memory (ROM), a solid state memory, etc. The software or firmware instructions may include machine readable instructions that, when executed by one or more processors, cause the one or more processors to perform various acts described herein.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for transferring data between a solid state memory and a host computer, the method comprising:
    receiving, at a bridge device, a first memory access command from the host computer, the first memory access command indicating a memory operation to be performed by the solid state memory device and including an indication of one or more blocks of memory locations in a host memory of the host computer;
    storing the first memory access command in a queue of the bridge device;
    allocating, by the bridge device, one or more buffers in a buffer memory for the first memory access command;
    determining, by the bridge device, one or more virtual addresses to be used by the solid state memory device for the first memory access command;
    generating, by the bridge device, a second memory access command that is a version of the first memory access command having some information included in the first memory access command, including generating the second memory access command to include an indication of the one or more virtual addresses rather than the indication of the one or more blocks of memory locations in the host memory;
    sending, by the bridge device, the second memory access command to the solid state memory device while keeping the first memory access command in the queue, the sending of the second memory access command to the solid state memory device to prompt the solid state memory device to perform the second memory access command to transfer data between the solid state memory device and the one or more buffers in the buffer memory; and
    transferring, by the bridge device, data between the one or more blocks of memory locations in the host memory and the one or more buffers within the buffer memory.

2. The method for transferring data of claim 1, wherein:
    the first memory access command includes Scatter Gather List (SGL) information that indicates one or more blocks of memory locations in the host memory; and
    the one or more virtual addresses correspond to one or more Physical Region Page (PRP) pages.

3. The method for transferring data of claim 2, wherein:
    the first memory access command is a first Non-Volatile Memory Express (NVMe) command having a data pointer field;
    the second memory access command is a second NVMe command;
    the SGL information is indicated by the data pointer field;
    generating the second memory access command includes generating the second memory access command so that the SGL information indicated by the data pointer field is replaced in the second NVMe command with an indication of one or more virtual addresses that correspond to one or more PRP pages.

4. The method for transferring data of claim 3, wherein:
    the first NVMe command includes a field that indicates the first NVMe command includes SGL information;
    the second NVMe command is generated to include a field that indicates the second NVMe command includes PRP information.

5. The method for transferring data of claim 1, wherein:
    the first memory access command is a first read command;
    the second memory access command is a second read command;
    sending the second memory access command to the solid state memory device prompts the solid state memory device to retrieve data from a non-volatile medium of the solid state memory device and to transfer the data to the one or more buffers in the buffer memory; and
    transferring data between the one or more blocks of memory locations in the host memory and the one or more buffers within the buffer memory comprises transferring data from the one or more buffers within the buffer memory to the host memory.

6. The method for transferring data of claim 5, wherein determining the one or more virtual addresses comprises using an indication of a location of the first read command in the queue to generate the one or more virtual addresses, the method further comprising, in connection with transferring data from the one or more buffers within the buffer memory to the host memory:
    identifying, by the bridge device, the first read command in the queue based on the one or more virtual addresses; and
    using, by the bridge device, the indication of one or more blocks of memory locations in the host memory within the first read command to determine a mapping between the one or more buffers within the buffer memory and the one or more blocks of memory locations in the host memory.

7. The method for transferring data of claim 5, wherein:
    transferring data from the one or more buffers within the buffer memory to the host memory begins prior to receiving all of the data corresponding to the first read command from the solid state memory device.

8. The method for transferring data of claim 1, wherein:
    the first memory access command is a first write command;
    the second memory access command is a second write command;
    transferring data between the one or more blocks of memory locations in the host memory and the one or more buffers within the buffer memory comprises transferring data from the host memory to the one or more buffers within the buffer memory; and sending the second memory access command to the solid state memory device prompts the solid state memory device to transfer data from the one or more buffers in the buffer memory and store the data to a non-volatile medium of the solid state memory device.

9. The method for transferring data of claim 8, wherein:
sending the second memory access command to the solid state memory device occurs prior to the bridge device receiving all of the data corresponding to the first write command from the host computer.

10. The method for transferring data of claim 9, wherein:
sending the second memory access command to the solid state memory device prompts the solid state memory device to begin storing data corresponding to the first write command prior to the bridge device receiving all of the data corresponding to the first write command from the host computer.

11. A bridge device for transferring data between a solid state memory and a host computer, the bridge device comprising:
  a network interface configured to receive memory access commands from the host computer via a network fabric;
  a solid state memory interface configured to communicatively couple the bridge device to the solid state memory;
  a buffer memory configured to store data between transferred between the host computer and the solid state memory;
  a plurality of queues;
  a controller configured to:
    store a first memory access command in a first queue among the plurality of queues, the first memory access command received from the host computer via the network interface, the first memory access command indicating a memory operation to be performed by the solid state memory device and including an indication of one or more blocks of memory locations in a host memory of the host computer,
    allocate one or more buffers in a buffer memory for the first memory access command, and
    transfer data between the one or more blocks of memory locations in the host memory and the one or more buffers within the buffer memory in connection with the first memory access command; and
  command modification circuitry configured to:
    generate a second memory access command that is a version of the first memory access command having some information included in the first memory access command, including generating the second memory access command to include an indication of the one or more virtual addresses to be used by the solid state memory device in connection with the first memory access command rather than the indication of the one or more blocks of memory locations in the host memory, and
    send the second memory access command to the solid state memory device while the first memory access command remains in the queue, the sending of the second memory access command to the solid state memory device to prompt the solid state memory device to perform the second memory access command to transfer data between the solid state memory device and the one or more buffers in the buffer memory.

12. The bridge device of claim 11, wherein:
the first memory access command includes Scatter Gather List (SGL) information that indicates one or more blocks of memory locations in the host memory; and
the one or more virtual addresses correspond to one or more Physical Region Page (PRP) pages.

13. The bridge device of claim 12, wherein:
the first memory access command is a first Non-Volatile Memory Express (NVMe) command having a data pointer field;
the second memory access command is a second NVMe command;
the SGL information is indicated by the data pointer field;
the command modification circuitry configured to generate the second memory access command so that the SGL information indicated by the data pointer field is replaced in the second NVMe command with an indication of one or more virtual addresses that correspond to one or more PRP pages.

14. The bridge device of claim 13, wherein:
the first NVMe command includes a field that indicates the first NVMe command includes SGL information;
the command modification circuitry configured to generate the second NVMe command to include a field that indicates the second NVMe command includes PRP information.

15. The bridge device of claim 11, wherein:
the first memory access command is a first read command;
the second memory access command is a second read command;
sending the second memory access command to the solid state memory device prompts the solid state memory device to retrieve data from a non-volatile medium of the solid state memory device and to transfer the data to the one or more buffers in the buffer memory; and
the controller is configured to transfer data from the one or more buffers within the buffer memory to the host memory.

16. The bridge device of claim 15, wherein:
the command modification circuitry is configured to use an indication of a location of the first read command in the queue to generate the one or more virtual addresses;
the controller is configured to, in connection with transferring data from the one or more buffers within the buffer memory to the host memory:
  identify the first read command in the queue based on the one or more virtual addresses, and
  use the indication of one or more blocks of memory locations in the host memory within the first read command to determine a mapping between the one or more buffers within the buffer memory and the one or more blocks of memory locations in the host memory.

17. The bridge device of claim 15, wherein the controller is configured to:
control the network interface to begin transferring data from the one or more buffers within the buffer memory to the host memory prior to the bridge receiving all of the data corresponding to the first read command from the solid state memory device.

18. The bridge device of claim 11, wherein:
the first memory access command is a first write command;
the second memory access command is a second write command;

the controller is configured to store data corresponding to the first write command from the host memory to the one or more buffers within the buffer memory; and sending the second memory access command to the solid state memory device prompts the solid state memory device to transfer data from the one or more buffers in the buffer memory and store the data to a non-volatile medium of the solid state memory device.

19. The bridge device of claim 18, wherein:

sending the second memory access command to the solid state memory device occurs prior to the bridge device receiving all of the data corresponding to the first write command from the host computer.

20. The bridge device of claim 19, wherein:

sending the second memory access command to the solid state memory device prompts the solid state memory device to begin storing data corresponding to the first write command prior to the bridge device receiving all of the data corresponding to the first write command from the host computer.

* * * * *